United States Patent
Xiong (10) Patent No.: US 10,320,283 B1
(45) Date of Patent: Jun. 11, 2019

(54) RESONANT CONVERTER WITH PRE-CHARGING CIRCUIT FOR STARTUP PROTECTION

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/032,145

(22) Filed: Jul. 11, 2018

Related U.S. Application Data (60) Provisional application No. 62/622,368, filed on Jan. 26, 2018.

(51) Int. Cl.
| | |
|---|---|
| *H02M 1/36* | (2007.01) |
| *H02M 1/32* | (2007.01) |
| *H05B 33/08* | (2006.01) |
| *H02M 1/088* | (2006.01) |
| *H02M 3/158* | (2006.01) |
| *H02M 1/00* | (2006.01) |

(52) U.S. Cl.
CPC ............. *H02M 1/32* (2013.01); *H02M 1/088* (2013.01); *H02M 1/36* (2013.01); *H02M 3/158* (2013.01); *H05B 33/0815* (2013.01); *H02M 2001/0058* (2013.01)

(58) Field of Classification Search
CPC .......... H02M 1/08; H02M 1/088; H02M 1/32; H02M 1/36; H02M 3/00; H02M 3/02; H02M 3/022; H05B 37/02; H05B 33/02; H05B 33/08; H05B 33/0812; H05B 33/0815

See application file for complete search history.

(56) References Cited

U.S. PATENT DOCUMENTS

| | | | | |
|---|---|---|---|---|
| 6,154,375 | A | * | 11/2000 | Majid ..................... H02M 1/36 323/901 |
| 8,804,382 | B2 | | 8/2014 | Stone et al. |
| 9,350,260 | B2 | | 5/2016 | Dai et al. |
| 9,735,686 | B2 | | 8/2017 | Adragna et al. |
| 9,769,890 | B1 | | 9/2017 | Xiong et al. |
| 2006/0290388 | A1 | * | 12/2006 | Tolle ................ H03K 17/04123 327/108 |

(Continued)

*Primary Examiner* — Jason Crawford
(74) *Attorney, Agent, or Firm* — Patterson Intellectual Property Law, P.C.; Gary L. Montle (57) ABSTRACT

A power converter as disclosed herein includes circuitry to reduce switching current spikes as conventionally appear at startup, and control the current spikes in a predictable way, thereby improving reliability of the power converter. A controller generates drive signals to half-bridge switching elements, an output therefrom corresponding to a frequency of the gate drive signals. A resonant tank comprises a resonant capacitor, DC blocking capacitor, a resonant inductor, and a load. Pre-charge circuitry is coupled to the resonant tank and, after initially receiving power from the DC power source and prior to controller startup, pre-charges at least the DC blocking capacitor to a steady state operating value. By pre-charging the DC blocking capacitor to its steady state voltage even before startup of the controller, AC current is introduced into the resonant inductor after the low-side switching element is first turned on and soft switching is provided throughout.

20 Claims, 8 Drawing Sheets

(56) References Cited

U.S. PATENT DOCUMENTS

| | | | |
|---|---|---|---|
| 2007/0230228 A1* | 10/2007 | Mao | H02M 3/156 363/109 |
| 2012/0223667 A1* | 9/2012 | Wang | H02M 3/1588 318/768 |
| 2012/0230059 A1* | 9/2012 | Adragna | H02M 3/3376 363/16 |
| 2012/0262086 A1* | 10/2012 | Feldtkeller | G01R 19/003 315/291 |
| 2013/0063186 A1* | 3/2013 | DeBeer | H03K 17/164 327/109 |
| 2014/0313790 A1 | 10/2014 | Feng et al. | |
| 2015/0318778 A1 | 11/2015 | Gong et al. | |
| 2016/0149504 A1 | 5/2016 | Quigley | |
| 2018/0175735 A1* | 6/2018 | Zhao | H02M 3/3376 |
| 2018/0287601 A1* | 10/2018 | Yang | H03K 17/04106 |

\* cited by examiner

RESONANT CONVERTER WITH PRE-CHARGING CIRCUIT FOR STARTUP PROTECTION

CROSS-REFERENCES TO RELATED APPLICATIONS

This application claims benefit of U.S. Provisional Patent Application No. 62/622,368, filed Jan. 26, 2018, which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to half bridge resonant-type power converters. More particularly, the present invention relates to LED drivers including circuitry for pre-charging one or more energy storage elements in the resonant tank to reduce turn-on current spikes.

Figure 1:
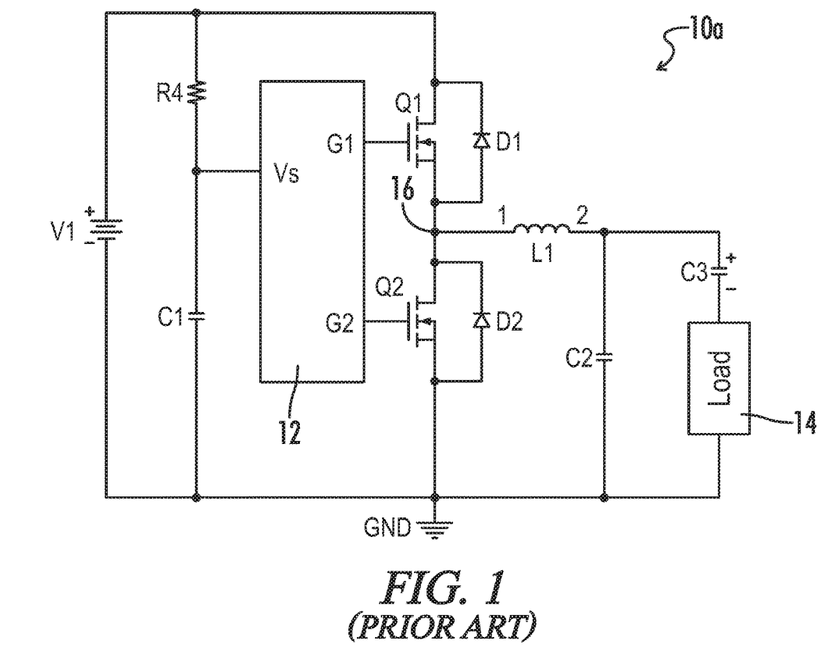
FIG. 1 is a circuit diagram representing an exemplary half bridge resonant type converter as known in the prior art.

Half-bridge resonant type converters are currently very popular, at least because of their relatively wide output range and high efficiency. A first typical topology for a half-bridge resonant type converter 10a is illustrated by reference to FIG. 1. Switching elements Q1 and Q2 are connected in series to form a half-bridge with an output node 16 there between. A resonant tank is coupled to the output node 16 and in the present example is formed by an inductor L1 and a capacitor C2 as the primary resonant components for the resonant tank, as well as a load 14 and a DC blocking capacitor C3 to substantially prevent DC current from going through the resonant inductor L1 and the load 14. A controller 12 is configured to provide gate drive signals to drive the half bridge switching elements Q1 and Q2. The half bridge switching elements Q1 and Q2 are coupled across a DC voltage source V1, further in parallel with a resistor R4 and capacitor C1 that serve as a power supply circuit for the controller. Body diodes D1 and D2 are provided for switching elements Q1 and Q2 that help with free-wheeling the negative current. By adjusting the gate drive frequency the output can be adjusted easily.

Figure 2:
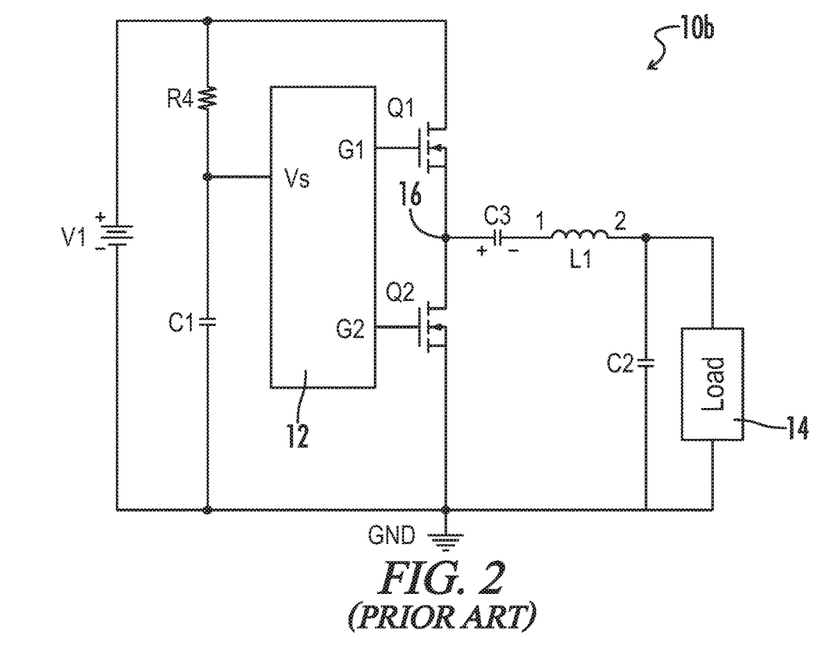
FIG. 2 is a circuit diagram representing another exemplary half bridge resonant type converter as known in the prior art.

In an alternative conventional topology as illustrated in FIG. 2, the DC blocking capacitor C3 can be connected in the circuit in a different way and still have the same function. Here, the DC blocking capacitor C3 is coupled between the half bridge output node 16 and the resonant inductor L1.

When well designed, the resonant tank (e.g., formed by the resonant inductor L1, resonant capacitor C2, DC blocking capacitor C3, and the load 14) may be inductive in nature. In other words, the inductor current I_L1 will always be lagging the voltage at the half bridge output node 16 such that the half-bridge switching elements will maintain soft-switching operation, and thereby reduce switching losses with relatively high efficiency.

Figure 3:
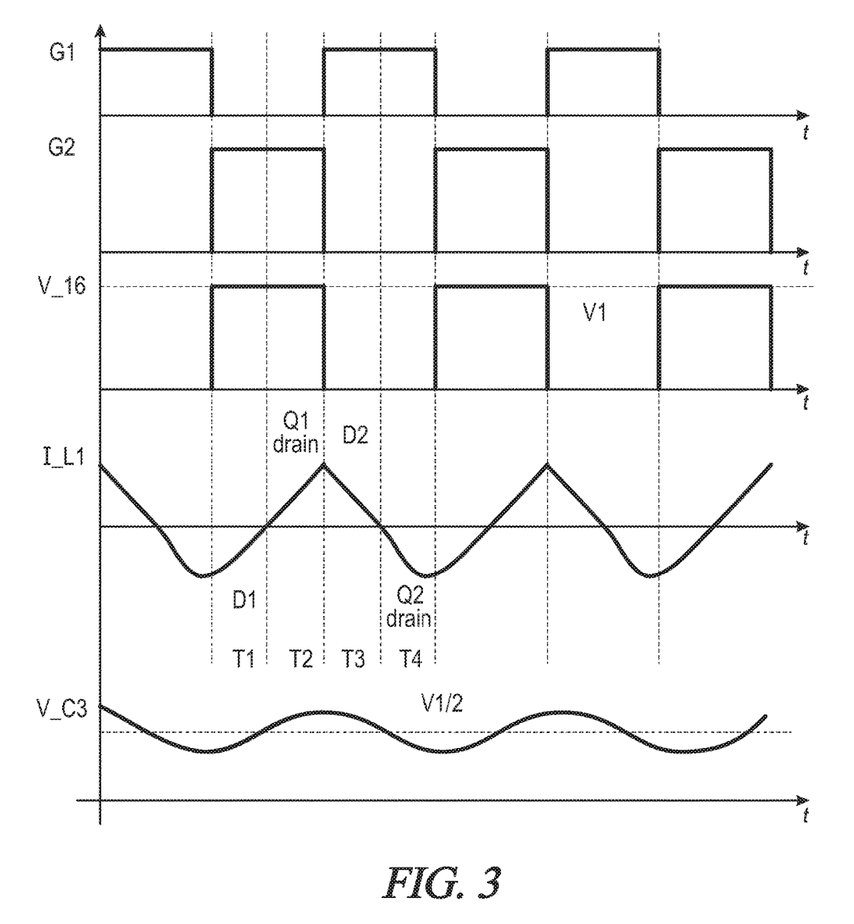
FIG. 3 is a diagram representing exemplary gate drive signals and power characteristic waveforms during steady state operation of a power converter.

Referring now to FIG. 3, steady state switching operation and associated waveforms are provided for further illustration. As shown therein, steady state gate drive signals G1 and G2 (for Q1 and Q2, respectively) are quasi-square wave voltage signals with duty ratios of slightly less than 50%. The resonant inductor current I_L1 is shown to be lagging the half bridge output voltage V_16. After gate drive signal G2 turns off the low-side switching element Q2, gate drive signal G1 turns high to turn on the high-side switching element Q1. The inductor current I_L1 is negative before the high-side switching element Q1 turns on. This negative current will be forced into the body diode of the high-side switching element Q1 and force the voltage across this switching element Q1 to 0. When the inductor current changes to positive, it will flow through the drain channel of the high-side switching element Q1. Since the high-side switching element Q1 turns on with 0 voltage across it, soft-switching (i.e., zero-voltage-turn-on) is achieved. One of skill in the art may appreciate that soft-switching helps reduce switching losses and improve converter efficiency.

FIG. 3 further illustrates the voltage V_C3 across the DC blocking capacitor C3 during stead state operation. The voltage V_C3 has a DC value of one half the positive rail voltage from the DC source (i.e., V1/2) along with a relatively small AC ripple component.

The most stressful moment for the conventional half-bridge resonant type converter is during start-up procedures. High current spikes are possible during startup because there is no energy stored in the resonant tank (e.g., L1, C2, C3).

Figure 4:
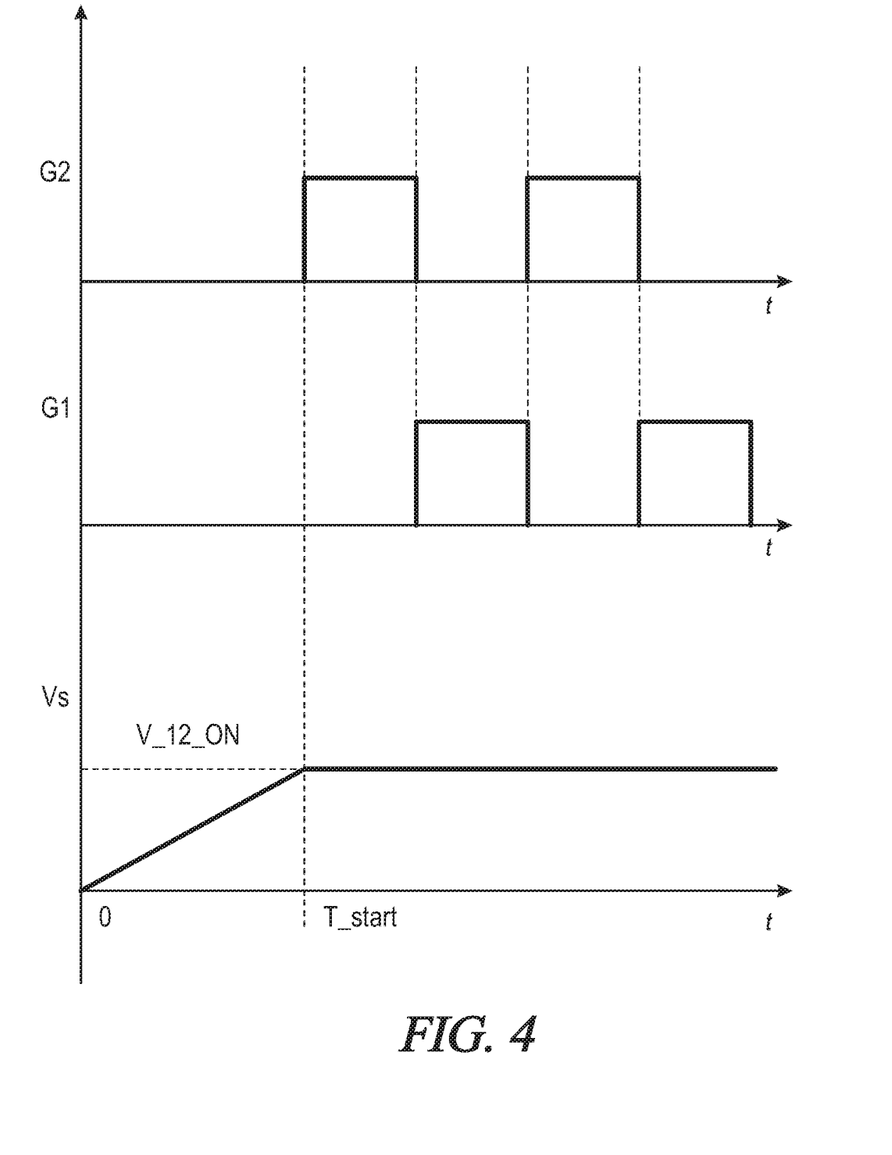
FIG. 4 is a diagram representing exemplary gate drive signals and input power from a DC voltage source over time during startup operation for a controller.

Referring next to FIG. 4, an exemplary startup process for the controller is illustrated. The controller 12 needs input from the power supply to start up, and it typically has a turn-on threshold voltage, V_on. An input-side capacitor C1 may provide the energy for the controller 12 to start and run. A resistor R4 is coupled in series with the capacitor C1 to provide the charging path for the capacitor C1 from the rail voltage V1. When the voltage across the input capacitor C1 reaches the turn-on threshold voltage V_on, the controller begins generating gate drive pulses G1 and G2. The controller generates the low side switch gate drive signal G2 first to allow the boot-strap circuit to be charged up for the high side switch gate drive.

Figure 5:
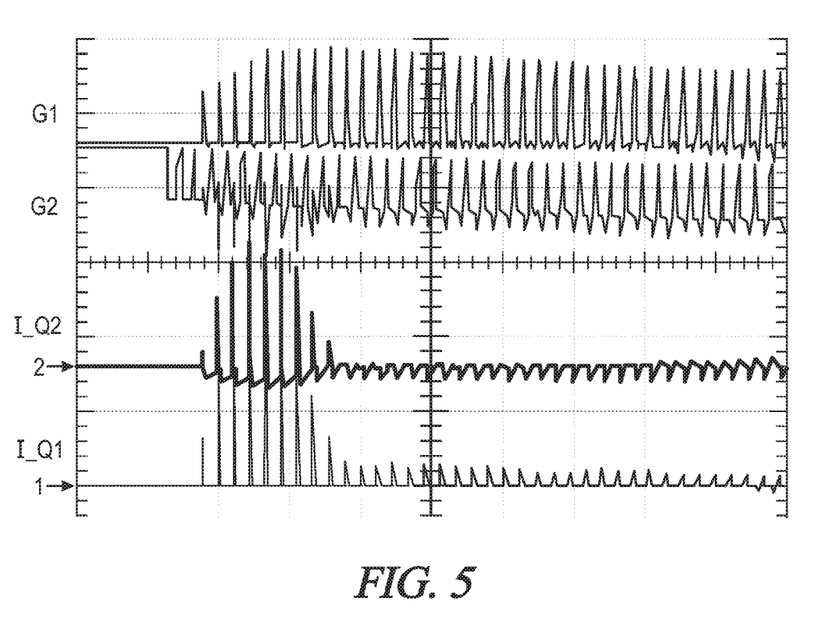
FIG. 5 is a diagram representing exemplary power characteristic waveforms during a startup operation for the half bridge switching circuit.

A typical switch current waveform during startup of the half bridge circuit is shown in FIG. 5. Before the half bridge switching elements Q1 and Q2 are turned on, there is no energy stored in the resonant tank. Accordingly, when the high side switch Q1 turns on the DC power supply V1 will force a series of large current pulses to charge up the resonant tank. The current spike can often approach or even exceed 10 A, and is unpredictable as well. The large current spike puts a significant amount of stress on the half bridge switching elements and can cause damage to these and other power converter components.

BRIEF SUMMARY

To improve the reliability of the converter, it is very desirable to reduce the turn-on switching current spike and further to control it in a predictable way.

An exemplary of a power converter as disclosed herein includes first and second switching elements coupled in series across a DC power source, and a controller configured to generate drive signals to the switching elements, wherein an output from the switching elements corresponds to a frequency of the gate drive signals. A resonant circuit is coupled to an output node between the switching elements and includes first and second capacitors, a resonant inductor, and output terminals for receiving a load. A pre-charge circuit coupled to the resonant circuit and configured, after initially receiving power from the DC power source and prior to startup of the controller, to pre-charge at least one of the first and second capacitors in the resonant circuit.

In another embodiment, the pre-charge circuit may be configured to pre-charge the at least one of the first and second capacitors to a steady state charge value for the at least one of the first and second capacitors. If for example the first and second switching elements are coupled between a positive rail of the DC power source and a circuit ground, the steady state charge value for the at least one of the first and second capacitors will typically correspond to one half of a voltage across the positive rail and the circuit ground. The at least one of the first and second capacitors may be configured, after startup of the controller and an initial turning on of the second switching element, to discharge through the resonant inductor and the second switching element.

In another embodiment, for example where the load is a capacitive load, the resonant inductor and the first capacitor are coupled in series on a first end to a node between the first and second switching elements and on a second end to a circuit ground. The second capacitor and the load are coupled in series on a first end to a node between the resonant inductor and the first capacitor. The pre-charge circuit includes a first resistor coupled between a positive rail of the DC power source and the node between the resonant inductor and the first capacitor, and a second resistor coupled between the circuit ground and the node between the resonant inductor and the first capacitor.

In the aforementioned embodiment, the first and second resistors may be provided with equivalent resistance values.

Where the load is an inductive load, the pre-charge circuit of the aforementioned embodiment may further include a third resistor coupled on a first end to a node between the second capacitor and the load, and on a second end to the circuit ground.

In another embodiment, the resonant tank of the power converter may be alternatively arranged such that the second capacitor, the resonant inductor and the first capacitor are coupled in series on a first end to a node between the first and second switching elements and on a second end to a circuit ground, and the load is coupled in parallel with the first capacitor. The pre-charge circuit may in this embodiment include a first resistor coupled between a positive rail of the DC power source and the node between the first and second switching elements, and a second resistor coupled between the circuit ground and the node between the first and second switching elements.

If an inductive load is provided for the aforementioned embodiment, the pre-charge circuit may further include a third resistor coupled on a first end to a node between the first capacitor and the resonant inductor, and on a second end to the circuit ground.

In another embodiment, the power converter as disclosed herein may be an LED driver provided for a light fixture and configured to provide output power to a load comprising one or more lighting elements.

DETAILED DESCRIPTION

Referring generally to FIGS. 6-11, various exemplary embodiments of an invention may now be described in detail. Where the various figures may describe embodiments sharing various common elements and features with other embodiments, similar elements and features are given the same reference numerals and redundant description thereof may be omitted below.

One of skill in the art may appreciate that if the resonant tank can be preset at steady state levels for current through the resonant inductor L1 and voltage across the DC blocking capacitor C3, the power converter will not have any transient state and accordingly no current spike during turn-on because the resonant tank is already in the soft-switching state.

It is understandably difficult to introduce AC current through the resonant inductor L1 before startup of the controller 12. However, a pre-charging circuit as disclosed herein can pre-charge the DC blocking capacitor C3 close to the voltage level in steady state for the power converter, which may be V1/2. By pre-charging the energy stored in the DC blocking capacitor C3 to the steady state value of V1/2 before controller startup, AC current will be introduced into the resonant inductor L1 after the low-side switching element Q2 turns on.

Figure 6:
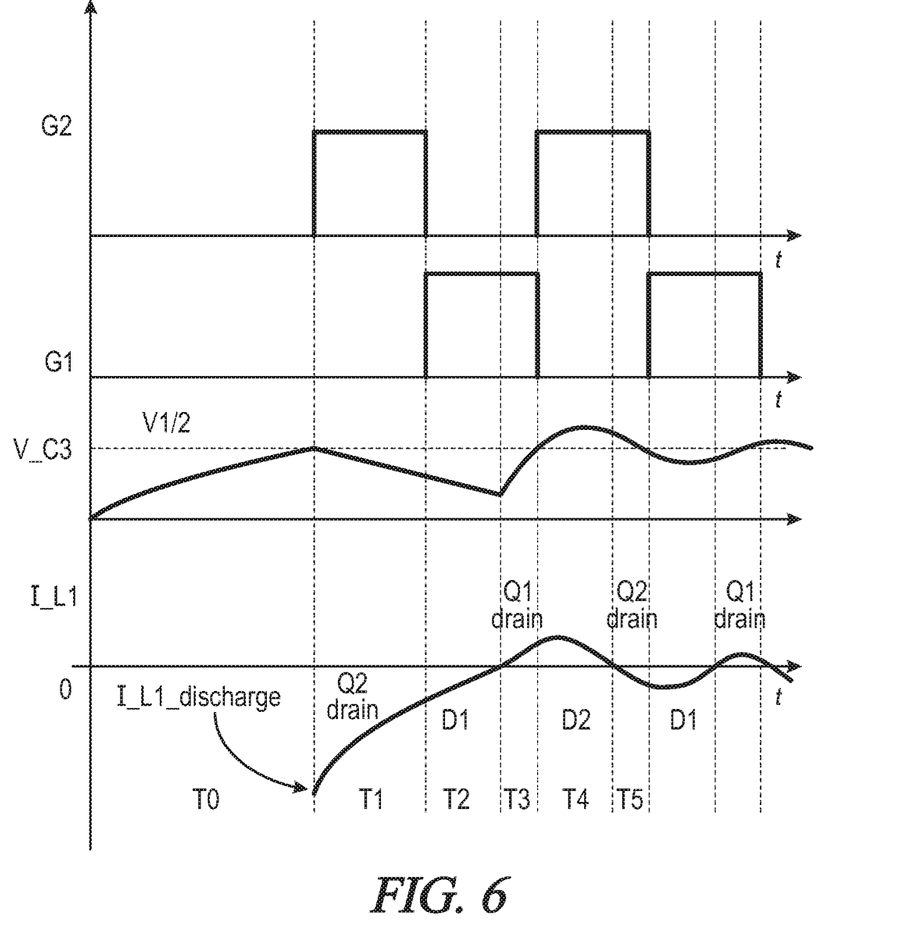
FIG. 6 is a diagram representing exemplary gate drive signals and power characteristic waveforms during a startup operation for an embodiment of a power converter as disclosed herein.

Referring to FIG. 6, before startup of the controller the DC blocking capacitor C3 is charged up to the steady state value V1/2. When the controller starts up and turns on the low side switching element Q2, the energy stored in the DC blocking capacitor C3 will be discharged through the resonant inductor L1 and the low-side switching element Q2. As a result, a current spike will be introduced to start up the tank. This current spike is predictable and can be calculated as:

$$I\_Lres\_discharge = \frac{\frac{V_{rail}}{2}}{L_{res}} \cdot \frac{1}{2 \cdot f_{start}}$$

After the first pulse, no additional large current spikes should be generated on the low side switching element Q2 because the pulse current will be kept flowing through body diode D1 after the low side switching element Q2 turns off. One of skill in the art may appreciate that as long as the body diode D1 conducts current before the high side switching element Q1 drain starts to conduct current, the half bridge circuit will be provided with zero-voltage switching (turn-on). Accordingly, the first current pulse will force the half-bridge circuit into soft-switching operation very quickly and will effectively reduce the switching current spike.

Figure 7:
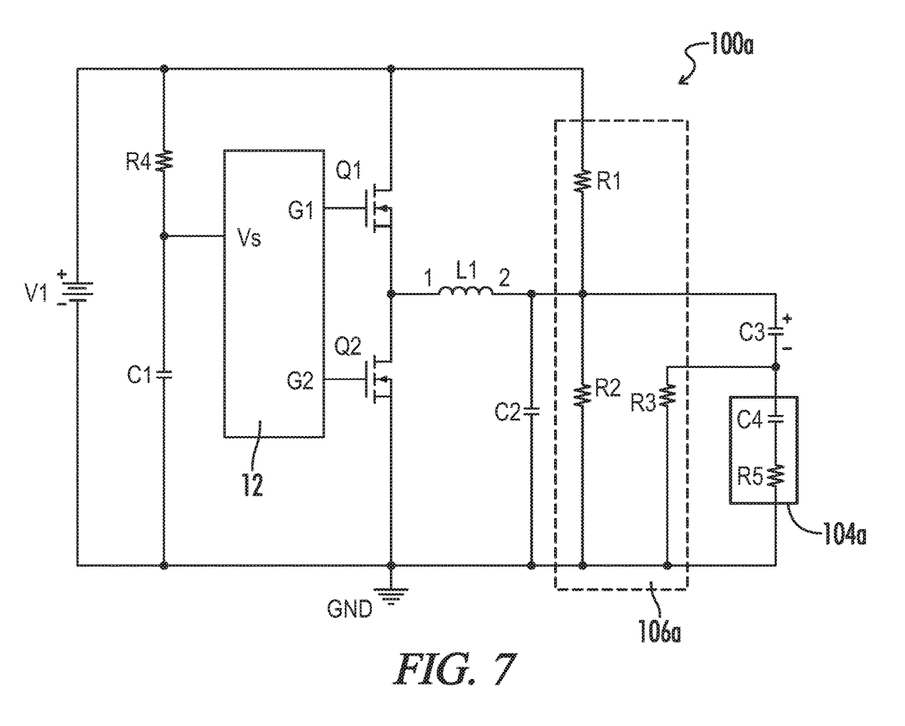
FIG. 7 is a circuit diagram representing an embodiment of a power converter as disclosed herein.

In a particular embodiment as represented in FIG. 7, an exemplary pre-charging circuit 106a is provided for a half-bridge resonant converter 100a. In this embodiment, the resonant inductor L1 is coupled directly to the output node between the half bridge switching elements Q1 and Q2, in series with the resonant capacitor C2 which is coupled to circuit ground. The DC blocking capacitor C3 is coupled in series with a capacitive load 104a, collectively in parallel with the resonant capacitor C2. Main charging resistors R1 and R2 are coupled in series across the half bridge switching elements Q1 and Q2, with a node between the resistors R1, R2 being coupled to a node between the resonant inductor L1 and the resonant capacitor C2. The resistors R1 and R2 may be designed to have the same resistance.

For a capacitive load 104a another resistor R3 may be provided to complete the charging path for the DC blocking capacitor C3. In the example shown, the third resistor R3 is coupled on one end between the DC blocking capacitor C3 and the load 104a, and on the other end to circuit ground. It is very straightforward to calculate the DC voltage across the DC blocking capacitor C3 as follows:

$$V\_Cdc\_precharge = \frac{V_{rail}}{R1 + R2} \cdot R2 = \frac{V_{rail}}{2}$$

In the equation above, the resistance values for the two resistors R1 and R2 are considered to be identical.

Figure 8:
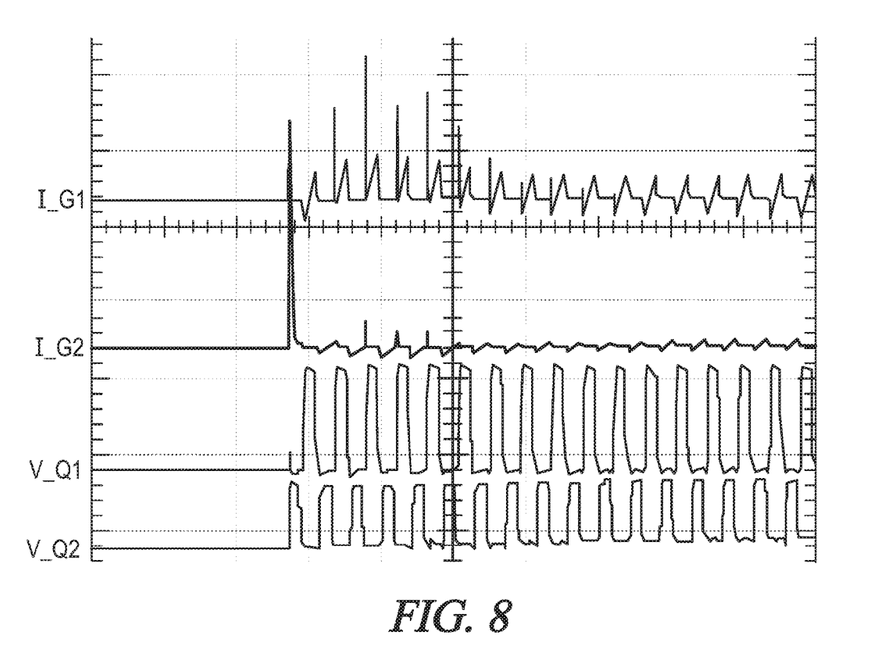
FIG. 8 is a diagram representing an exemplary startup waveform for the power converter including a pre-charge circuit as disclosed herein.

Referring next to FIG. 8, an exemplary start-up waveform is represented for a power converter implementing the pre-charging circuit as disclosed herein.

One may readily appreciate, by way of comparison for example to the diagram in FIG. 5 (i.e., representing start-up without the pre-charging circuit), the low side switch current spike I_G2 is much lower, for example 6 Ampere instead of the more unpredictable 10 Ampere. The high side switching current spike I_G1 is also only 937 mA as compared to the 8A as represented in FIG. 5.

Thanks to the first turn-on current spike, the resonant tank reaches the steady state much more quickly, and the start-up is relatively clean. These features help to reduce the current stress through the half-bridge switching elements, and dramatically improves the reliability of the converter.

Figure 9:
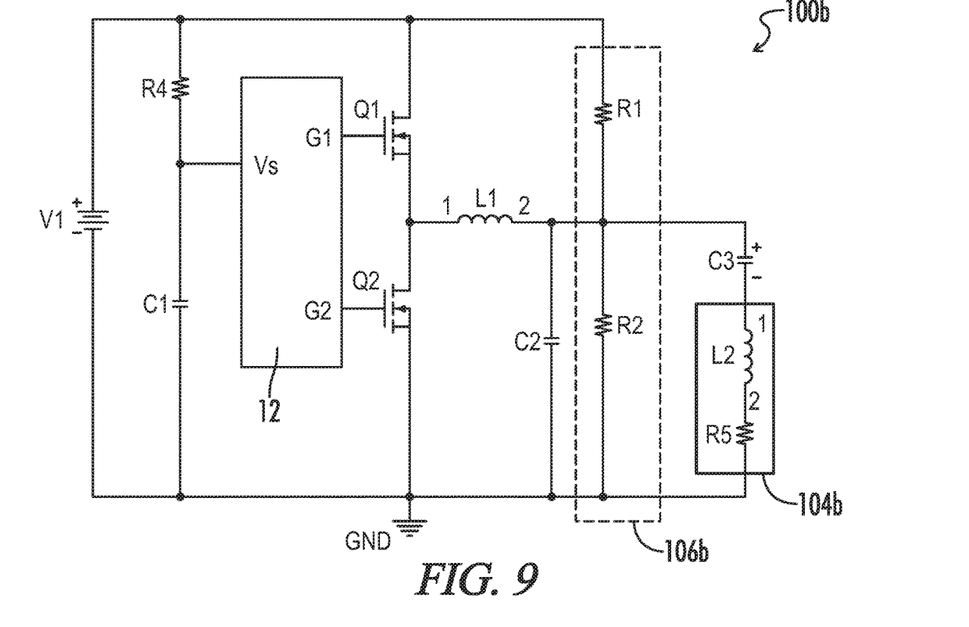
FIG. 9 is a circuit diagram representing another embodiment of a power converter as disclosed herein.

Referring next to FIG. 9, another embodiment of the pre-charging circuit 106b may be provided for the exemplary power converter 100b driving an inductive load type 104b. In this example, the third resistor R3 is unnecessary because the inductive load 104b already provides a DC charging path.

Figure 10:
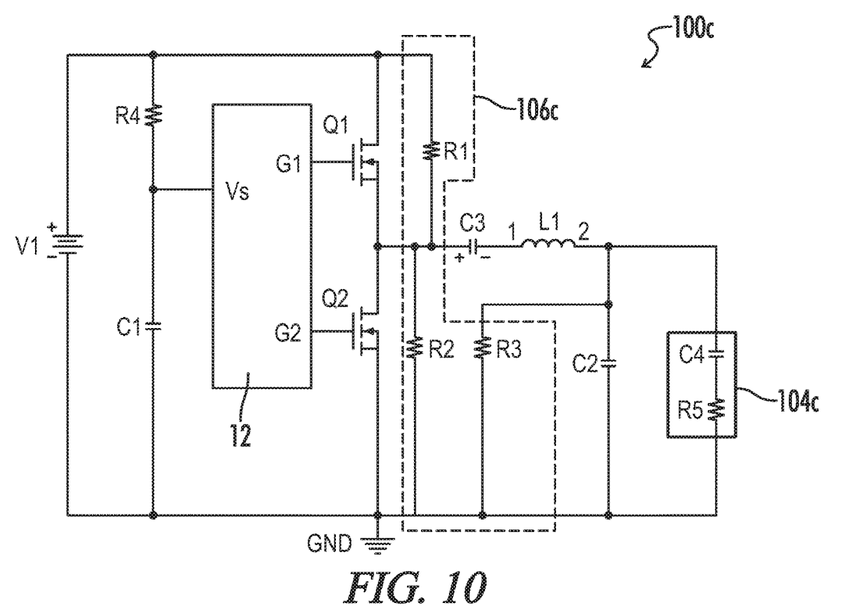
FIG. 10 is a circuit diagram representing another embodiment of a power converter as disclosed herein.

Referring to FIG. 10, another embodiment of a power converter 100c is provided wherein the DC charging capacitor C3 is now coupled directly between the half bridge output and the resonant inductor L1. An exemplary configuration of a pre-charging circuit 106c in this embodiment may include a first resistor R1 coupled on one end to the positive rail (i.e., between the high side switching element Q1 and the DC source V1) and on the other end to the half bridge output node, and a second resistor R2 coupled on one end to the circuit ground GND and on the other end to the half bridge output node. The load 104c in the embodiment of FIG. 10 is a capacitive type load, so a third resistor R3 is coupled on one end to a node between the resonant inductor L1 and the resonant capacitor C2 and on the other end to circuit ground GND, accordingly providing the requisite DC charging path.

Figure 11:
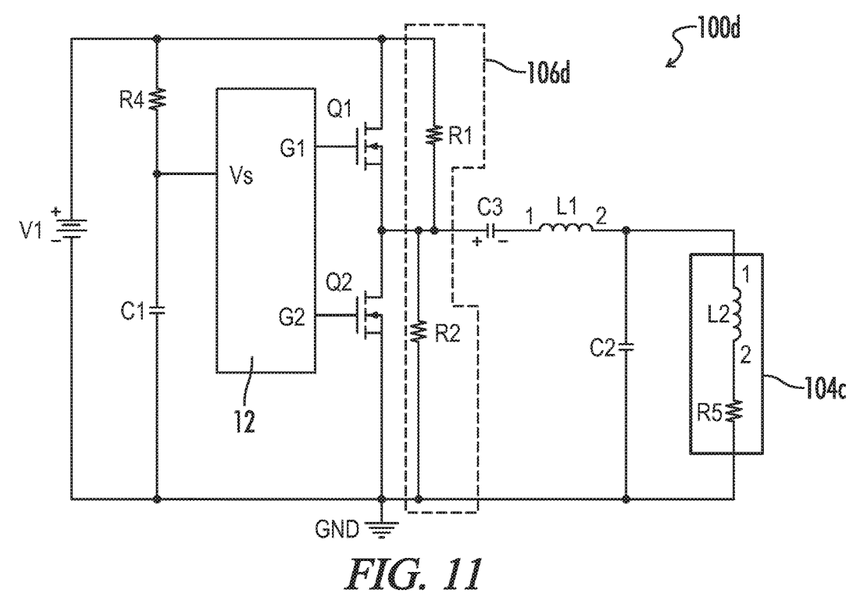
FIG. 11 is a circuit diagram representing another embodiment of a power converter as disclosed herein.

Referring next to FIG. 11, a power converter 100d includes a DC charging capacitor C3 arranged similarly as with the embodiment in FIG. 10, but the load 104d is now an inductive type load. The pre-charging circuit 106d in this embodiment does not require the third resistor R3 because the inductive load 104d already provides the DC charging path.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power converter comprising:
   first and second switching elements coupled in series between a positive rail of a DC power source and a circuit ground;
   a controller configured to generate drive signals to the switching elements, wherein an output from the switching elements corresponds to a frequency of the gate drive signals;
   a resonant circuit comprising first and second capacitors, a resonant inductor, and output terminals for receiving a load; and
   a pre-charge circuit coupled to the resonant tank and configured, after initially receiving power from the DC power source and prior to startup of the controller, to pre-charge at least one of the first and second capacitors in the resonant circuit to a steady state charge value for the at least one of the first and second capacitors, wherein the steady state charge value corresponds to one half of a voltage across the positive rail and the circuit ground.

2. The power converter of claim 1, wherein the at least one of the first and second capacitors is configured, after startup of the controller and an initial turning on of the second switching element, to discharge through the resonant inductor and the second switching element.

3. The power converter of claim 1, wherein:
   the resonant inductor and the first capacitor are coupled in series on a first end to a node between the first and second switching elements and on a second end to a circuit ground,
   the second capacitor and the load are coupled in series on a first end to a node between the resonant inductor and the first capacitor, and
   the pre-charge circuit comprises
      a first resistor coupled between a positive rail of the DC power source and the node between the resonant inductor and the first capacitor, and
      a second resistor coupled between the circuit ground and the node between the resonant inductor and the first capacitor.

4. The power converter of claim 3, wherein the pre-charge circuit is configured to pre-charge the second capacitor to a steady state charge value of one half a voltage across the positive rail and the circuit ground.

5. The power converter of claim 3, wherein the first and second resistors are provided with equivalent resistance values.

6. The power converter of claim 3, wherein the pre-charge circuit further comprises a third resistor coupled on a first end to a node between the second capacitor and the load, and on a second end to the circuit ground.

7. The power converter of claim 1, wherein:
   the second capacitor, the resonant inductor and the first capacitor are coupled in series on a first end to a node between the first and second switching elements and on a second end to a circuit ground,
   the load is coupled in parallel with the first capacitor, and
   the pre-charge circuit comprises
      a first resistor coupled between a positive rail of the DC power source and the node between the first and second switching elements, and
      a second resistor coupled between the circuit ground and the node between the first and second switching elements.

8. The power converter of claim 7, wherein the pre-charge circuit is configured to pre-charge the second capacitor to a steady state charge value of one half a voltage across the positive rail and the circuit ground.

9. The power converter of claim 7, wherein the first and second resistors are provided with equivalent resistance values.

10. The power converter of claim 7, wherein the pre-charge circuit further comprises a third resistor coupled on a first end to a node between the first capacitor and the resonant inductor, and on a second end to the circuit ground.

11. The power converter of claim 1, wherein the power converter comprises an LED driver provided in a light fixture and the load comprises one or more lighting elements.

12. A power converter comprising:
    first and second switching elements coupled in series across a DC power source;
    a controller configured to generate drive signals to the switching elements, wherein an output from the switching elements corresponds to a frequency of the gate drive signals;
    a resonant circuit comprising first and second capacitors, a resonant inductor, and output terminals for receiving a load, wherein:
       the resonant inductor and the first capacitor are coupled in series on a first end to a node between the first and second switching elements and on a second end to a circuit ground,
       the second capacitor and the load are coupled in series on a first end to a node between the resonant inductor and the first capacitor; and
    a pre-charge circuit comprising:
       a first resistor coupled between a positive rail of the DC power source and the node between the resonant inductor and the first capacitor, and
       a second resistor coupled between the circuit ground and the node between the resonant inductor and the first capacitor,
    wherein the pre-charge circuit is configured, after initially receiving power from the DC power source and prior to startup of the controller, to pre-charge at least one of the first and second capacitors in the resonant circuit.

13. The power converter of claim 12, wherein the pre-charge circuit is configured to pre-charge the second capacitor to a steady state charge value of one half a voltage across the positive rail and the circuit ground.

14. The power converter of claim 12, wherein the first and second resistors are provided with equivalent resistance values.

15. The power converter of claim 12, wherein the pre-charge circuit further comprises a third resistor coupled on a first end to a node between the second capacitor and the load, and on a second end to the circuit ground.

16. The power converter of claim 12, wherein the power converter comprises an LED driver provided in a light fixture and the load comprises one or more lighting elements.

17. A power converter comprising:
   first and second switching elements coupled in series across a DC power source;
   a controller configured to generate drive signals to the switching elements, wherein an output from the switching elements corresponds to a frequency of the gate drive signals;
   a resonant circuit comprising first and second capacitors, a resonant inductor, and output terminals for receiving a load, wherein:
      the second capacitor, the resonant inductor and the first capacitor are coupled in series on a first end to a node between the first and second switching elements and on a second end to a circuit ground, and
      the load is coupled in parallel with the first capacitor; and
   a pre-charge circuit comprising:
      a first resistor coupled between a positive rail of the DC power source and the node between the first and second switching elements, and
      a second resistor coupled between the circuit ground and the node between the first and second switching elements,
   wherein the pre-charge circuit is configured, after initially receiving power from the DC power source and prior to startup of the controller, to pre-charge at least one of the first and second capacitors in the resonant circuit.

18. The power converter of claim 17, wherein the pre-charge circuit is configured to pre-charge the second capacitor to a steady state charge value of one half a voltage across the positive rail and the circuit ground.

19. The power converter of claim 17, wherein the first and second resistors are provided with equivalent resistance values.

20. The power converter of claim 17, wherein the pre-charge circuit further comprises a third resistor coupled on a first end to a node between the first capacitor and the resonant inductor, and on a second end to the circuit ground.

* * * * *